(12) United States Patent
Yap et al.

(10) Patent No.: US 11,093,119 B2
(45) Date of Patent: Aug. 17, 2021

(54) USER INTERFACE ENGAGEMENT HEATMAPS

(71) Applicant: FullStory, Inc., Atlanta, GA (US)

(72) Inventors: Jaime Michael Yap, Atlanta, GA (US); Joel Grayson Webber, Decatur, GA (US); Joshua Calvin Teague, Marietta, GA (US); Robert Adam Rice, Atlanta, GA (US)

(73) Assignee: FullStory, Inc., Atlanta, GA (US)

( * ) Notice: Subject to any disclaimer, the term of this patent is extended or adjusted under 35 U.S.C. 154(b) by 38 days.

(21) Appl. No.: 16/528,111

(22) Filed: Jul. 31, 2019

(65) Prior Publication Data

US 2021/0034206 A1   Feb. 4, 2021

(51) Int. Cl.
| | | |
|---|---|---|
| *G06F 3/0484* | (2013.01) | |
| *G06F 3/0481* | (2013.01) | |
| *H04L 29/08* | (2006.01) | |
| *G06Q 30/02* | (2012.01) | |
| *H04N 21/442* | (2011.01) | |
| *G06F 11/34* | (2006.01) | |
| *G06F 9/451* | (2018.01) | |

(52) U.S. Cl.
CPC .......... *G06F 3/0484* (2013.01); *G06F 3/0481* (2013.01); *G06F 11/3438* (2013.01); *G06Q 30/0269* (2013.01); *H04L 67/22* (2013.01); *H04N 21/44224* (2020.08); *G06F 9/451* (2018.02); *H04N 21/44222* (2013.01)

(58) Field of Classification Search
CPC .... G06F 11/3438; G06F 3/0484; G06F 9/451; G06F 3/0481; G06Q 30/0269; H04N 21/44224; H04N 421/44222; H04L 67/22; H04L 29/08675
See application file for complete search history.

(56) References Cited

U.S. PATENT DOCUMENTS

| | | | | |
|---|---|---|---|---|
| 7,584,435 B2* | 9/2009 | Bailey | ............. | G06F 9/44526 715/788 |
| 7,941,525 B1* | 5/2011 | Yavilevich | ............. | H04L 67/02 709/224 |
| 9,154,365 B1* | 10/2015 | Henry | ............. | H04L 29/08072 |
| 9,418,172 B2* | 8/2016 | White | ............. | G06F 11/3438 |
| 9,495,383 B2* | 11/2016 | Mishra | ............. | G06Q 30/0269 |

(Continued)

*Primary Examiner* — Andrew L Tank
(74) *Attorney, Agent, or Firm* — Fish & Richardson P.C.

(57) ABSTRACT

Methods, systems, and apparatus, including computer programs encoded on a computer storage medium, for generating and presenting engagement heatmaps. In one aspect, a method includes generating and providing, to a client device, an interactive interface that includes a session replay area that presents playback of user interfaces presented during a user session. A detection is made, based on interaction data received from the client device, of user interaction with an interface control for viewing engagement heatmaps. In response to detecting the user interaction with the interface control, playback is paused. The interactive interface is updated to present, for each of two or more user interface elements presented by the given user interface, an engagement heatmap visualization that visually represents a relative quantity of user interactions with the user interface element when the user interface element was presented by the given interface.

21 Claims, 9 Drawing Sheets

(56) References Cited

U.S. PATENT DOCUMENTS

| | | | |
|---|---|---|---|
| 10,083,159 B1* | 9/2018 | Bekmambetov | G06F 3/0481 |
| 10,430,212 B1* | 10/2019 | Bekmambetov | G06F 9/451 |
| 2008/0046562 A1* | 2/2008 | Butler | G06F 16/958 |
| | | | 709/224 |
| 2012/0022951 A1* | 1/2012 | Tolompoiko | G06Q 30/0272 |
| | | | 705/14.68 |
| 2012/0158492 A1* | 6/2012 | Ye | G06Q 30/0241 |
| | | | 705/14.49 |
| 2013/0091417 A1* | 4/2013 | Cordasco | G06F 16/986 |
| | | | 715/234 |
| 2013/0132833 A1* | 5/2013 | White | G06F 11/3438 |
| | | | 715/704 |
| 2014/0068498 A1* | 3/2014 | Olsen | G06F 11/3438 |
| | | | 715/781 |
| 2014/0278746 A1* | 9/2014 | Kolowich | G06Q 30/0201 |
| | | | 705/7.29 |
| 2014/0280517 A1* | 9/2014 | White | H04L 67/22 |
| | | | 709/203 |
| 2015/0201030 A1* | 7/2015 | Longo | G06Q 50/10 |
| | | | 709/204 |
| 2016/0011755 A1* | 1/2016 | Douek | G06F 9/451 |
| | | | 715/704 |
| 2018/0124453 A1* | 5/2018 | Zweig | H04N 21/4312 |
| 2019/0034976 A1* | 1/2019 | Hamedi | G06Q 30/0204 |
| 2020/0327031 A1* | 10/2020 | Oh | H04L 67/025 |

\* cited by examiner

USER INTERFACE ENGAGEMENT HEATMAPS

BACKGROUND

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to resources or application pages (e.g., by interacting with an embedded link), and change visual aspects of the user interface (e.g., rotating a device, resizing a window, scrolling to other portions of a document, or using zoom controls). User satisfaction with a given website or application can depend on the user's experience with the user interface.

SUMMARY

In general, one innovative aspect of the subject matter described in this specification can be embodied in methods that include generating and providing, to a client device, an interactive interface that includes a session replay area that presents playback of user interfaces presented during a user session. A detection is made, based on interaction data received from the client device, of user interaction with an interface control for viewing engagement heatmaps. In response to detecting the user interaction with the interface control, playback is paused such that a given user interface that is being presented in the session replay area when the user interaction with the interface control is detected remains visible in the interactive interface while the playback is paused and the interactive interface is updated to present, for each of two or more user interface elements presented by the given user interface, an engagement heatmap visualization that visually represents a relative quantity of user interactions with the user interface element when the user interface element was presented by the given interface. Other embodiments of this aspect include corresponding methods, apparatus, and computer programs, configured to perform the actions of the methods, encoded on computer storage devices.

These and other embodiments can each optionally include one or more of the following features. In some aspects, the engagement heatmap visualization for each user interface element is presented over the user interface element while the playback is paused.

In some aspects, the engagement heatmap visualization for each user interface element is presented in a different color than the engagement heatmap visualization for each other user interface element to visually convey a magnitude of the relative quantity of user interactions with each user interface element. Some aspects include determining, for each engagement heatmap visualization, the color for the engagement heatmap visualization based on a ranking of the user interface elements. The user interface elements can be ranked based on the quantity according to a total number of user interactions for each user interface element during a set of sessions under consideration.

Some aspects include presenting a color scale in response to detecting the user interaction with the user interface control. The color scale can include, for at least a portion of the user interface elements, a geometric shape that has the same color as the engagement heatmap visualization for the user interface element. The geometric shape in the color scale can be ordered based on the ranking.

In some aspects, each geometric shape is a bar that has a length based on the quantity of user interactions for the user interface element corresponding to the bar. The length of each bar can be based on a ratio between the quantity of user interactions for the user interface element corresponding to the bar and a quantity of user interactions for the user interface element that had the highest quantity of user interactions. Adjacent bars in the color scale can be spaced apart based on a difference between the quantities of user interactions for the adjacent bars.

In some aspects, the user interface includes an event stream that includes, event elements for a sequence of events detected during the user session. Some aspects can include updating the event stream to present a sequence of expandable information elements for the user interface elements. Each expandable information element corresponds to a respective user interface element and includes, when expanded, data specifying the quantity of user interactions for the respective user interface element.

Some aspects include detecting user interaction with a given expandable information element and in response to detecting the user interaction with the given expandable information element, updating the interactive interface to present a caption over a given user interface element corresponding to the given expandable information element. The overlay element includes data specifying the quantity of user interactions for the given user interface element. The expandable information elements can be ordered based on the quantity of user interactions for the user interface elements corresponding to the expandable information elements.

Particular embodiments of the subject matter described in this specification can be implemented so as to realize one or more of the following advantages. Displaying engagement heatmap visualizations with user interfaces shows publishers which user interface elements receive the most user interactions across all users or particular subsets of users, e.g., users that are using particular types of devices, which provides insights into how users are interacting with the user interfaces. By displaying engagement heatmap visualizations for particular types of user interactions, such as rage clicks, dead clicks, or error clicks, the heatmaps inform publishers which areas of the user interface result in user frustration and errors, enabling the publishers to improve those areas of the user interface. For example, an interactive interface that displays heatmap visualizations for error clicks can show which buttons on a user interface result in errors when interacted with, e.g., clicked by, a user.

By presenting the engagement heatmap visualizations during playback of a user session, e.g., when the playback is paused, a publisher viewing the user session can request and view the heatmap visualizations for each of the different user interfaces presented during the user session. This allows the publisher to understand how a population of users interact with the user interfaces while watching how a particular user interacted with the user interfaces. This can show the publisher how the particular user's session differed from typical user sessions, which can explain why the particular user had difficulty in using the user interfaces. Presenting the engagement heatmaps during playback of user sessions also enables a publisher to quickly view the user interactions with the user interface elements of each user interface presented during the user session, e.g., without having to navigate to other user interfaces or search for such data. Using the structure of the user interfaces to determine which user interface elements users interact with enables the system to aggregate user interactions with user interface elements across different types of devices and different screen resolutions, and for dynamic content such as pop up windows.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Publishers (e.g., an entity that provides a user interface) generally want to make user interfaces user friendly so that users will have a positive experience. Having information about user interactions with a given user interface (e.g., a web page or an application interface) and events that occur during user sessions with user interfaces can help a publisher quickly identify aspects of the user interfaces that can be changed to improve the user experience. These aspects can be identified using actual user interactions with the user interface, thereby eliminating the need to conduct external user surveys or rely on subjective feedback about the user interface. Rather, the users' actual recorded interactions with the user interface and/or classifications of these user interactions based on the characteristics of the interactions reveal areas of the user interface that can be changed to improve the user experience. This document discusses interactive interfaces that present engagement heatmap visualizations that represent amounts of user interactions and/or types of user interactions with user interface elements displayed by user interfaces. The heatmap visualizations inform publishers of which user interface elements receive the most user interactions, or the most of a particular type of interaction, and enables the publishers to better understand how users interact with user interfaces.

An engagement heatmap visualization for a user interface element can represent a quantity of times users have interacted with the user interface element or a percentage of users that interacted with the user interface element when presented to the users. An engagement heatmap for an element can include a group of dots presented over the element and that has visual characteristics that are based on the quantity of user interactions with the corresponding user interface element. For example, the color or intensity of the color of the engagement heatmap visualization for a user interface element can be based on the quantity of user interactions with the user interface element. User interface elements can include various elements presented by user interfaces, including images, text, videos, links, controls, e.g., buttons, icons, sliders or checkboxes that initiate actions, background or foreground areas of the user interface that do not include other elements, and/or other appropriate content that can be presented by user interfaces.

The interactive interfaces can present the engagement heatmap visualizations for the user interface elements over the user interface elements in the user interface. For example, the engagement heatmap visualizations can be presented over the user interface elements when playback of a user session is paused. In this way, publishers can stop the playback of a user session and view the engagement heatmap visualizations for a particular user interface that is presented during the user session and that is of interests to the publisher.

Figure 1:
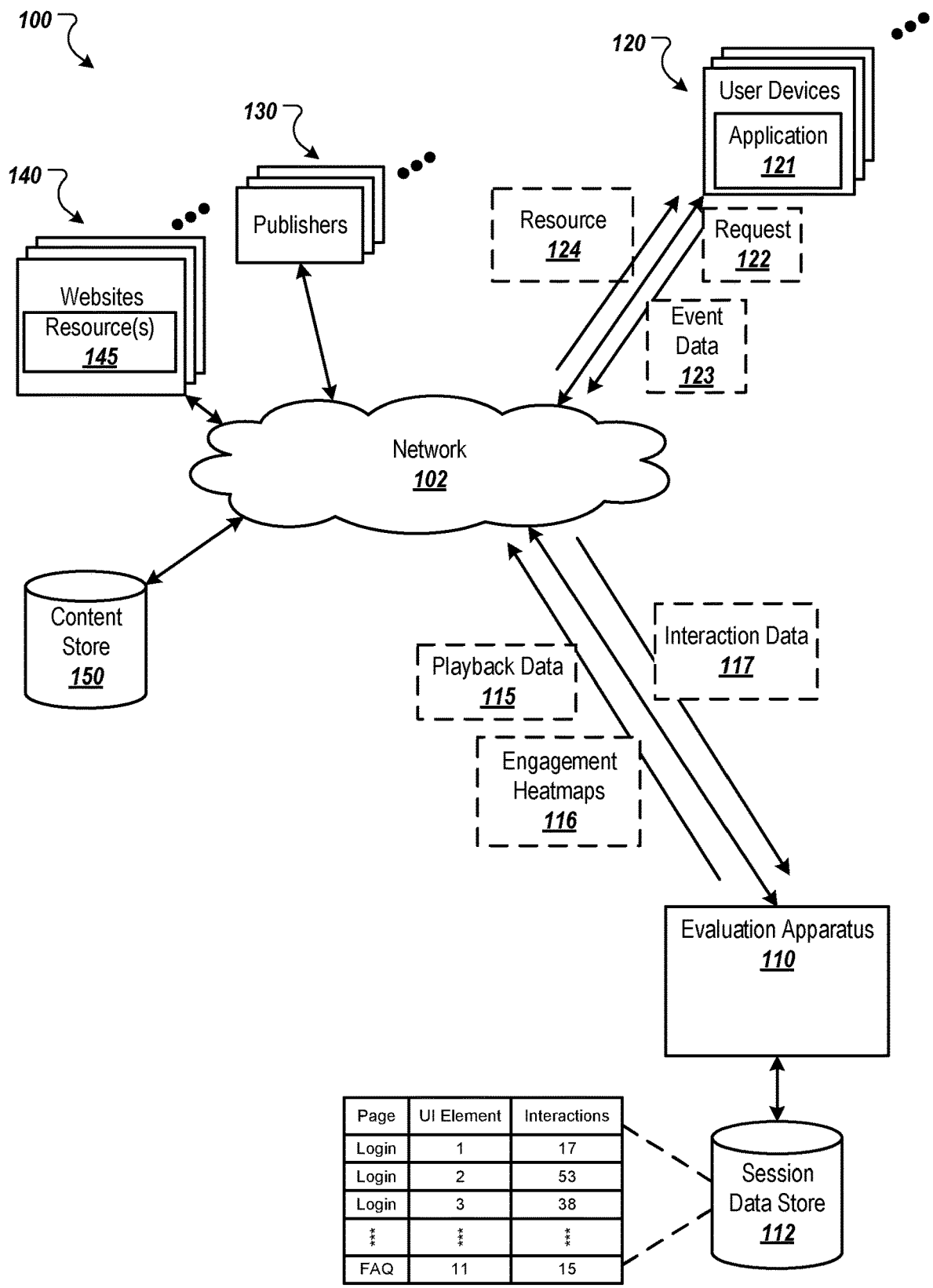
FIG. 1 is a block diagram of an example environment in which users interact with user interfaces.

FIG. 1 is a block diagram of an example environment 100 in which users interact with user interfaces. The example environment 100 includes a network 102, such as a local area network (LAN), a wide area network (WAN), the Internet, or a combination thereof. The network 102 connects user devices 120, publishers 130, websites 140, and an evaluation apparatus 110. The example environment 100 may include many different user devices 120, publishers 130, and websites 140.

A website 140 is one or more resources 145 associated with a domain name and hosted by one or more servers. An example website is a collection of web pages formatted in hypertext markup language (HTML) that can contain text, images, multimedia content, and programming elements, such as scripts. Each website 140 is maintained by a publisher 130, which is an entity that controls, manages and/or owns the website 140.

A resource 145 is any data that can be provided over the network 102. A resource 145 is identified by a resource address that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 120 is an electronic device that is capable of requesting and receiving resources over the network 102. Example user devices 120 include personal computers, mobile communication devices, and other devices that can send and receive data over the network 102. A user device 120 typically includes a user application 121, such as a web browser, to facilitate the sending and receiving of data over the network 102. The user device 120 can also include other user applications 121, such as native applications developed for a particular platform or a particular device. Publishers 130 can develop and provide the native applications to the user devices 120.

A user device 120 can submit a resource request 122 that requests a resource 145 from a website 140. In turn, data representing the requested resource 124 can be provided to the user device 120 for presentation by the user device 120. The requested resource 124 can be, for example, a home page of a website 140, a web page from a social network, or another resource 145. The data representing the requested resource 124 can include data that causes presentation of content (e.g., embedded content such as text that is included in the code of the resource) at the user device 120. The data representing the requested resource 124 can also include instructions that cause the user device 120 to request remote content from a content store 150. The remote content can include, for example, images, content that is updated periodically, content used across multiple different resources, or content provided by third parties (e.g., other than the publisher). Thus, the remote content can be updated or changed without having to update the resource code.

A native application can also present content with or without the user device 120 submitting a request for the content. For example, some native applications, e.g., games, can present content stored at the user device 120 without requiring a request for content. Other native applications, e.g., news applications, can request and present content obtained from an application server maintained by the publisher 130 of the native application.

The evaluation apparatus 110 generates and provides, to devices of the publishers 130, interactive interfaces that present playback of user sessions with user interfaces of the publishers 130. The interactive interfaces can also display engagement heatmap visualizations that represent the quantity of user interactions with (and/or percentage of users interacted with) user interface elements presented by the user interfaces.

To generate the interactive interfaces, the evaluation apparatus 110 collects event data 123 from the user devices 120. As used throughout this document, the phrase event data refers to data obtained from a user device 120 during a user session. A user session is a period of user interaction with one or more user interfaces, e.g., of a website or native application, of a publisher 130. In the context of a website, the user session can begin when a user requests a first resource from a given domain (e.g., example.com) and can end when a session end condition is met. In the context of a native application, the user session can begin when the user launches the native application and can end when a session end condition is met. The session end condition can be considered met when a specified amount of time elapses since a user interaction with a resource from the given domain or the native application. For example, if a user has not interacted with a resource from the given domain or the native application for 30 minutes (or some other amount of time), the session end condition can be considered to be met, thereby ending the session.

The session end condition can also be considered met when a session termination event occurs. The session termination event can be, for example, receipt of a session end message indicating that the user navigated away from the given domain or closed the browser, or a message specifying that the user closed the native application. Note that the session termination event may be stored at the user device 120 for some time (e.g., until the user reopens the browser or again launches the native application) prior to the user device 120 submitting the session end message to the evaluation apparatus 110.

The event data 123 can include data that can be used to playback the user session. For example, the event data 123 can include session replay data that is obtained and stored, and then used to generate playback data that presents one or more user interfaces that were presented during the user session and any visual changes to the user interface(s) that occurred during the user session. The sessions replay data can also include data that specifies other activity (e.g., mouse movements) that occurred during the user session. The session replay data can include interface data, user interaction data, and/or mutation data.

The interface data specifies a structure of a user interface that is presented at a user device during the session. For example, when the user device 120 renders a resource, the interface data can be an initial DOM of the resource that is first presented at a user device 120. In this example, the DOM would specify that the resource is initially presented. The user interaction data specify user interactions at the user device, and include user interactions with the elements of the user interface.

The user interaction data can specify mouse movements, user clicks, mouse hovers, highlights, text inputs, and any other user interactions that are performed at the user device. The user interaction data specify user interactions at the user device, and include user interactions with the elements of the user interface. The user interaction data can specify mouse movements, user clicks, mouse hovers, highlights, text inputs, and any other user interactions that are performed at the user device. For example, assume that a user clicks on an item in a list, in this example, the user interaction data will specify that a user click occurred and identify the element of the user interface that was clicked.

The user interaction data for an element with which a user interacted can identify the element using a unique identifier for the element. The identifier for an element can be in the form of an alphanumeric sequence that is unique for each user interface element. For resources that include a DOM, the resource identifier can be the identifier for an object, e.g., obtained from the DOM id property. This enables the evaluation apparatus 110 to aggregate the number of user interactions with each user interface element across multiple user sessions of multiple different users, as described below.

The user interaction data can also include timestamp information and/or sequential numbering information specifying when each user interaction occurred so that the user interaction data can be coordinated with other data. For example, the user interaction data can specify an absolute time at which a given user interaction occurred and/or a number representing when a given user interaction occurred relative to other user interactions a set of user interactions (e.g., user interaction 50 out of 150 total user interactions).

The user interaction data can be obtained, for example, by inserting an interaction tracking script in the code of the resource (or native application). The interaction tracking script will monitor mouse movement, clicks, and other user actions. In the context of a tablet or other touchscreen device, the interaction tracking script monitor user taps, swipes, pinches, and other user interactions with the touchscreen device. For some native applications, the user interaction data can be obtained using reflection techniques to determine which user interface elements are interacted with, as described in U.S. patent application Ser. No. 16/038,002, filed on Jul. 17, 2018, entitled "Capturing and Processing Interactions with a User Interface of a Native Application," which is herein incorporated by reference. For some native applications, user interaction data can be obtained by swizzling methods that detect user interactions, as described in U.S. patent application Ser. No. 16/370,574 filed on Mar. 29, 2019, entitled "Capturing and Processing Interactions with a User interface of a Native Application," which is herein incorporated by reference.

Using these techniques, the user interaction data can specify the actual user interface element interacted with, based on the current structure of the DOM or view tree used to generate the user interface. This allows the data to specify the actual element event for dynamic user interfaces for which the structure can change and/or new elements can be presented by the user interface. For example, if a pop up window is presented, e.g., based on a script or in response to a user interaction, and element of the pop up window is interacted with, the interaction data can specify the element of the pop up window with which the interaction occurred as this data would be part of the DOM structure or the view tree.

Using the user interface structure, e.g., the DOM structure, to determine which user interface elements are interacted with enables the evaluation apparatus 110 to aggregate the user interactions for user interface elements independent of the type of device, screen resolution, or other factors that might make the user interface element appear differently. For example, attempting to assign a location on a screen at which a user interaction occurred to elements can be erroneous when the elements are presented in different locations based on resolution or when the location of elements change dynamically.

The mutation data can specify each element that is rendered by the user device 120, and the mutation data can be provided to the evaluation apparatus 110 (e.g., either sequentially or in sets of mutation data that were accumulated over a specified time by the user device 120). Using the mutation data, the evaluation apparatus 110 can reconstitute the DOM in a manner similar to that performed by a browser. The mutation data can be obtained, for example, by inserting a mutation observer script in the code of the resource (or native application). The mutation of observer script can monitor the resource for changes to the structure of the resource, record mutation data representing the changes in local memory at the user device 120, and provide the mutation data to a specified location (e.g., the evaluation apparatus 110). Providing mutation data rather than recorded video of the user session reduces the amount of data that has to be recorded and transferred across the network 102. This limits the negative latency impact and bandwidth consumption of this technology.

The mutation data specify changes to the structure of the user interface that occur during a user session. For example, assume that a user clicks on an item in the list, which causes a first image to be replaced by a second image. In this example, the mutation observer script can detect the removal of the first image and the addition of the second image in the user interface, and store mutation data at the user device 120 specifying that the first image was removed from the user interface and that the second image was inserted into the user interface. Alternatively, or additionally, the mutation data can directly specify the replacement of the first image by the second image (e.g., rather than specifying both the remove mutation and the add mutation). Periodically, the user device 120 can upload (or otherwise transmit) the mutation data to the evaluation apparatus 110, which processes the mutation data as described in more detail below.

Example techniques for obtaining event data that can be used to playback user sessions are described in U.S. Pat. No. 9,766,769, filed on Dec. 31, 2014, entitled, "Evaluation of Interactions with a User Interface," and U.S. patent application Ser. No. 16/038,002, filed on Jul. 17, 2018, entitled "Capturing and Processing Interactions with a User Interface of a Native Application," which are herein incorporated by reference.

The event data 123 for a user session can also include error data that specifies errors detected during the user session. For each detected error, the event data 123 can also include timestamp information and/or sequential numbering information specifying when each error occurred so that the user interaction data can be coordinated with other data. For example, the errors can be detected using an error monitoring script.

In another example, the event data can include console logs that specify a message logged to a browser's console during the user session. The console logs provide information about specific events, including client-side errors, that occurred and can document different states of the user session. The console logs can include, for at least some of the messages, timestamp information that indicates a time at which the message was generated. This information can be used to determine when errors occurred during the user session. Because the console logs are generated by the browser (or other application) on the user device 120, the data of the console logs is generally not reported to a remote server absent the use of the present technology. Instead, in prior systems, the data of the console logs remains local to the user device, and therefore is not used in the manner discussed throughout this document.

The event data 123 can be transmitted to the evaluation apparatus 110 in one or more data transmissions. For example, each type of event data 123 can be sent separate from each other type of event data. In another example, the event data 123 for each page can be transmitted to the evaluation apparatus 110 after the page has loaded on the user device 120.

The evaluation apparatus 110 receives the event data 123 from the user device 120 and stores the event data 123 in a session data store 112. For example, the evaluation apparatus 110 can store the event data 123 in an index of session data that is stored in the session data store 112. The index of session data can include, for each user session, the event data 123 received for that user session and optionally additional data, such as context data relating to user device 120 (e.g., the type of user device 120, the make and model of the user device 120, hardware and/or software of the device, the geographic location of the device, etc.). The software specified by the context data can include the type of browser, version of the browser, or other data about the browser.

The evaluation apparatus 110 can index the event data 123 and the contextual data in the session data store 112. This enables a user to search for user sessions that include particular events or attributes and/or filter user sessions based on the events or attributes. For example, the evaluation apparatus 110 can receive a query for one or more attributes, e.g., a type of browser and type of event (e.g., one or more rage clicks) that occurred during the user session. The evaluation apparatus 110 can use the index to identify each user session that occurred using the type of browser specified by the query and during which an event of the type specified by the query occurred. The evaluation apparatus 110 can then provide data that presents the identified user sessions in an interactive interface.

The evaluation apparatus 110 can aggregate the quantity of user interactions with user interface elements of user interfaces presented during user sessions. The user interactions can include selections, e.g., clicks, hovers, swipes across the element, and/or other appropriate user interactions with elements that can be detected. In some implementations, the evaluation apparatus 110 determines the quantity of times users interacted with each user interface element for each user interface (e.g., web page or an application interface such as an application page) with which the user interface element is presented. For example, if an image is presented on two different web pages, the evaluation apparatus 110 can determine the quantity of user interactions with (e.g., selections of) the image when the image was presented on the first web page and the quantity of user interactions with the image when the image was presented on the second web page.

As some user interfaces can be referenced by different URLs, e.g., dynamic URLs, the evaluation apparatus 110 can determine the logical pages of a publisher's website or application, e.g., using machine learning techniques. For example, a login page may be one logical page that can have different URLs but have the same or similar structure for each user. Example techniques for identifying logical pages are described in U.S. patent application Ser. No. 15/896,167, filed on Feb. 14, 2018, entitled "User Interface Structural Clustering and Analysis," which is herein incorporated by reference.

The evaluation apparatus 110 can aggregate the quantities of user interactions for each particular user interface element for each individual state or structure of a user interface. For example, an image can be presented by one or more web pages (or application pages) that can have multiple different DOM (or other structural states). For each state, the evaluation apparatus 110 can determine a quantity of times the image was interacted with when presented with the DOM in that state. In this way, a publisher 130 can view the user interaction counts for the various elements in each different DOM state. To do this, the evaluation apparatus can identify each user session in which a user interface was presented with the DOM in a particular state. The evaluation apparatus 110 can then identify each user interface element that was presented with the DOM in the particular state during those user sessions. For each of these user interface elements, the evaluation apparatus 110 can determine the quantity of times each user interface element was interacted with when presented with the DOM in the particular state across those user sessions.

The aggregations for the user interface elements can be cross-device aggregations even though the user interface elements may be presented differently on different types of devices (e.g., tablet device versus smart phone versus desktop). For example, the same DOM structure can result in a different on screen presentation depending on the type of device. In a particular example, an image may be presented in two different areas of a web page when presented on two different types of devices. As long as the same DOM structure was presented on the different devices and the user interface element was presented and interacted with, the user interactions of the different devices can be aggregated for that DOM structure.

In some implementations, the evaluation apparatus 110 attributes an interaction with a user interface element, e.g., a DOM element, irrespective of where on the user interface element the interaction occurred. If a user interaction occurred anywhere on the user interface element, the evaluation apparatus 110 can determine that the user interface element received a user interaction.

In a particular structure-based aggregation example, the evaluation apparatus 110 can determine, for each logical page of a publisher 130, the quantity of times users interacted with each user interface element of the logical page. For example, the evaluation apparatus 110 can identify, for a publisher 130, each logical page of the publisher's application and/or website based on the structure of the application and/or website, e.g., using machine learning techniques as described above. The evaluation apparatus 110 can then identify, in the session data store 112, each user session that included presentation of the logical page. These user sessions can include user sessions that occurred on multiple different types of devices of multiple different users. The evaluation apparatus 110 can then determine, for each user session, a number of times, if any, each user interface element of the logical page was interacted with during the user session irrespective of where on the display the element was presented. The evaluation apparatus 110 can then determine, for each user interface element of the logical page, an aggregate quantity of user interactions with the user interface element across the user sessions in which the logical page was presented. For example, the aggregate quantity can be the sum of the user interactions with the user interface element across the user sessions in which the logical page was presented.

By determining the quantities of user interactions with user interface elements for each user interface structure, e.g., based on DOM structure or logical page, publishers 130 can better visualize how users interact with the user interfaces that have those structures. In addition, the publishers 130 can filter the data based on device type (e.g., mobile or desktop). The user interaction quantities for a user interface structure based on device type can show the differences in the way that users interact with the same types of user interfaces on different types of devices, which can reveal a problem with the user interface in particular environments. For example, this data can reveal a problem with a particular DOM structure when the particular DOM structure is presented on a smart phone or tablet device, but not when presented on a desktop or with a particular browser.

The evaluation apparatus 110 can also determine a percentage of users that interacted with the user interface element across the user sessions in which the logical page was presented. For example, the evaluation apparatus 110 can determine the quantity of unique users that were involved in these user sessions, e.g., the quantity of unique users that initiated a user session with user interfaces of the publisher and in which the logical page was presented. For each user interface element, the evaluation apparatus can also identify, in the session data store 112, the quantity of users of these user sessions that interacted with the user interface element during the user sessions. To determine the percentage of users that interacted with the user interface element, the evaluation apparatus 110 can divide the quantity of users that interacted with the user interface element by the quantity of unique users that were involved in the user sessions and multiple the quotient by 100. For example, if the logical page was presented to ten users and five clicked on the user interface element during the user sessions, the percentage of users that interacted with the user interface element would be 5/10*100=50%.

The evaluation apparatus 110 can determine the quantity of user interactions for a user interface element and the percentage of users that interacted with the user interface element for particular types of user interactions. The evaluation apparatus 110 can classify user interactions into types of user interactions and determine these metrics for each type of user interaction. For example, the evaluation apparatus 110 can classify some user interactions as error clicks, rage clicks, and/or dead clicks and determine the metrics for each of these types of user interactions.

An error click is a selection of a user interface element, e.g., a mouse click or touch selection of the element, that is considered to have caused an error, e.g., a client-side error such as a script error for a script that is executed in response to selection of a control. The evaluation apparatus 110 can determine whether user interactions are error clicks based on data identifying errors that occurred during the user sessions, data identifying when the errors occurred in the user sessions (e.g., timestamp or sequential numbering information), and data identifying when the user interactions occurred in the user sessions (e.g., timestamp or sequential numbering information). As described above, the error data can be included in the event data for a user session, e.g., in console logs for the user session. The error data can also include errors that are detectable by a server different from the user device 120, e.g., by the evaluation apparatus 110 or a server providing content to the user device 120 for presentation during the user session. These server-detectable errors can include network errors (e.g., timeout events in which the content server does not respond in a specified time period), request errors (e.g., when a user device requests a non-existent resource), and/or other appropriate errors. For example, if an error occurred in a user session within a threshold duration of time after a user interaction with a user interface element was detected in the user session and there were not intervening user interactions between that user interaction and the error, the evaluation apparatus 110 can determine that the user interaction with the user interface element is an error click. The duration of time can be 100 milliseconds (ms), 500 ms, or another appropriate duration.

In some implementations, the evaluation apparatus 110 classifies user interactions only for particular types of errors. For example, the evaluation apparatus 110 can classify, as error clicks, user interactions that occurred within a threshold duration of time before user interface errors that can be caused by user interactions with user interface controls that initiate an action by the user interface. These errors can include script errors for scripts that are to be executed in response to user interactions with interface controls.

A rage click is a set of user selections, e.g., mouse clicks or touch selections, that occur in succession in the same area of a user interface, e.g., on the same element. For example, a person clicking the same button on the interface multiple times in a short period of time can indicate that a user is frustrated with the user interface. A rage click can indicate to a publisher 130 that the user interface did not react the way the user expected.

The evaluation apparatus 110 can determine whether user interactions are rage clicks based on a quantity of user interactions detected within a threshold duration of time in the same area of the user interface. The quantity of user interactions can be three, five, eight, or another appropriate number. The threshold duration of time can be one second, 1.5 seconds, two seconds, or another appropriate duration. The evaluation apparatus 110 can determine that the user interactions are in the same area of the user interface if they occur at the same user interface element, within a threshold distance (e.g., number of pixels) of each other, or within a same defined area of the user interface.

A dead click is a user selection, e.g., a mouse click or touch selection of the element, that does not have an effect on the user interface. For example, an image may appear in the user interface as an image for which the user interface will zoom in if the image is selected. If the user selects the image and nothing happens, the selection can be considered a dead click.

The evaluation apparatus 110 can determine whether user interactions are dead clicks based on data identifying when user selections occur and data identifying whether the user interface changed. For example, the evaluation apparatus 110 can evaluate the mutation data for the user session to determine whether the user interface changed within a threshold duration of time after the user interaction occurred. The evaluation apparatus 110 can use the timestamp or sequential ordering information for the user interaction and the timestamp or sequential ordering information for the mutation data to identify the appropriate mutation data for the user interface(s) of the user session that followed the user interaction. For example, the evaluation apparatus 110 can then determine whether the identified mutation data includes any data specifying a change to the user interface, e.g., the movement of an image, navigation to a different user interface, etc. If the identified mutation data does not specify a change to the user interface, the evaluation apparatus 110 can classify the user interaction as a dead click.

The evaluation apparatus 110 can determine the quantity of user interactions for a user interface element and the percentage of users that interacted with the user interface element for each type of user interaction in a similar manner as determining the aggregate metrics described above. For example, the evaluation apparatus 110 can identify user sessions that include presentation of a particular user interface, e.g., a particular logical page, that includes the user interface element. For each of these sessions, the evaluation apparatus 110 can identify each user interaction with the user interface element and determine whether each user interaction is an error click, a rage click, a dead click, or neither. The evaluation apparatus 110 can then determine an aggregate quantity of each type of user interaction across the identified user sessions (e.g., by counting, summing, or otherwise determining the total number of each type of user interaction). The evaluation apparatus 110 can determine the percentage of users that initiated each type of user interaction by identifying the quantity of unique users that initiated that type of user interaction across the identified user sessions and divide that number by the total quantity of users of the identified user sessions. The evaluation apparatus 110 can then multiply the quotient by 100. For example, if two users initiated rage clicks on the user interface element and a total of ten users viewed the user interface that includes the user interface element, the percentage of rage click users would be 2/10*100=20%.

The evaluation apparatus 110 can determine the total quantities of user interactions and/or the quantities of each type of interaction for a set of user sessions under consideration. For example, a publisher can filter the user sessions considered for purposes of determining the total quantities of user interactions with its user interfaces based on one or more parameters. The parameters can include events, e.g., user sessions in which particular events occurred. For example, a publisher may want to view playback of user sessions and user interaction data for user sessions in which users completed a purchase, user sessions in which users aborted the session prior to making a purchase, user sessions in which a particular error occurred, or user sessions in which a user rage clicked. Combinations of these parameters can also be used, as can sequences of user interactions (e.g., added an item to a shopping cart, rage clicked, then aborted the session).

The parameters can include user parameters, e.g., geographic location at which the sessions occurred, device parameters, e.g., make, model, and/or type of device on which the sessions occurred, and/or software parameters, e.g., operating system and/or browser. For example, a publisher may want to view playback of user sessions and user interaction data for user sessions that occurred in California using a tablet device and in which the user rage clicked.

The evaluation apparatus 110 can identify the user sessions that match the parameters and determine the user interaction data for the identified user sessions. For example, the evaluation apparatus 110 can determine the total quantity of user interactions with each user interface element presented during at least one of the identified user sessions. This total quantity would only be based on the user interactions that occurred during the identified user sessions that are under consideration, rather than across all user sessions unless all user sessions match the parameters. The evaluation apparatus 110 can determine similar quantities for error clicks, rage clicks, dead clicks, and/or other types of user interactions.

The evaluation apparatus 110 can generate and provide, for a user session, an interactive interface that includes playback data 115 that presents playback of one or more user interfaces presented during the user session and visual changes to the user interface(s) of the user interface(s) presented during the user session. The playback data 115 can also cause visual presentation of mouse movements and/or user interactions, e.g., user clicks. In some implementations, the location of a user click can be visually represented by the presentation of a shaded (or colored) area at the location of the user click.

The interactive interface can also include engagement heatmap visualizations for at least some of the user interface elements of the user interface(s) presented in the playback. For example, the interactive interface can include an interface control that, when selected, causes the user device 120 to send, to the evaluation apparatus 110, interaction data 117 specifying that the control was selected. In response, the evaluation apparatus 110 can pause the playback of the user session and update the interactive interface to present engagement heatmap visualizations 116 for the user interface presented in the paused playback. Some example interactive interfaces generated and provided by the evaluation apparatus 110 are illustrated in FIGS. 2-8 and described below.

Figure 2:
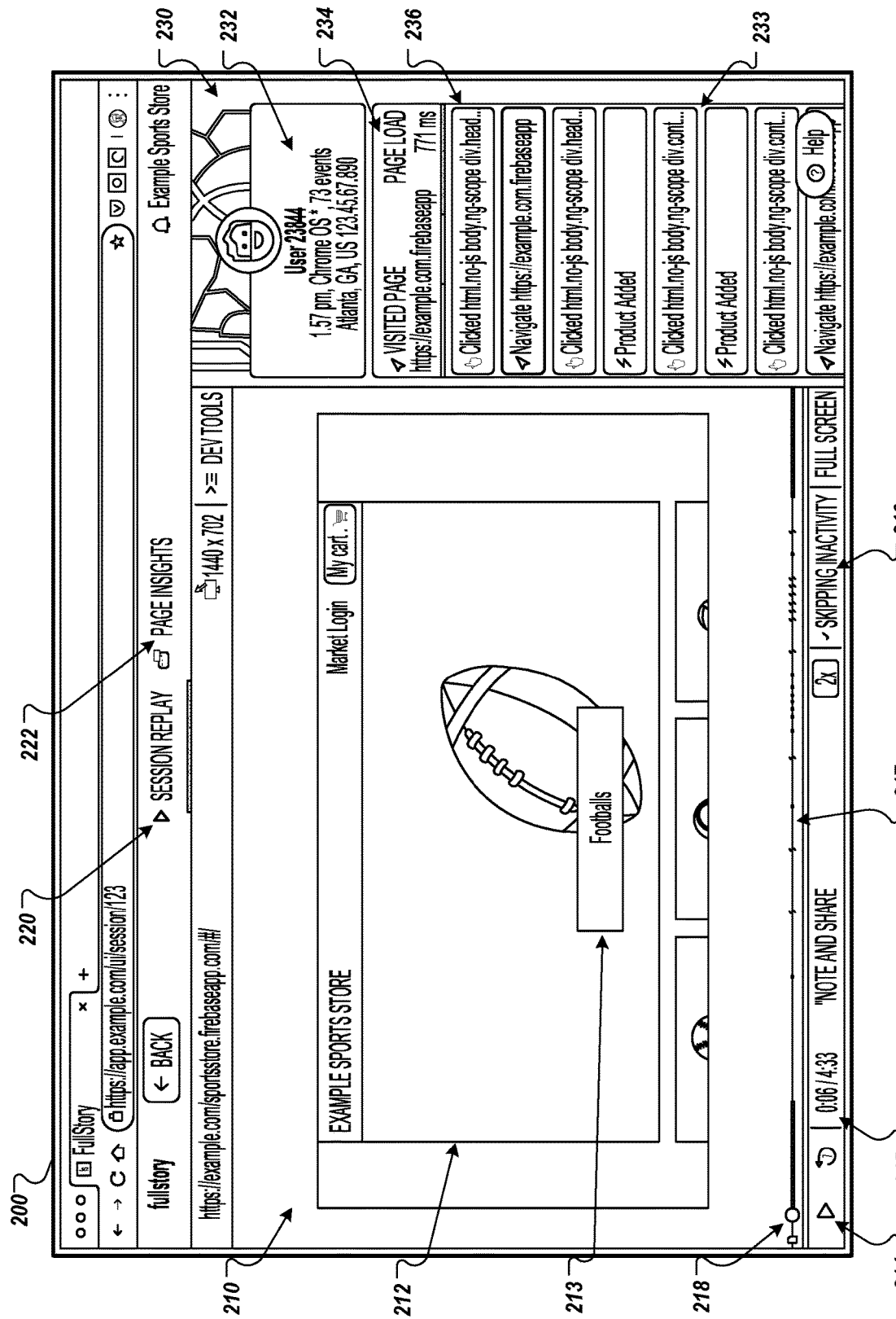
FIG. 2 is an illustration of an example interactive interface for replaying a user session and presenting data related to events that occurred during the session.

FIG. 2 is an illustration of an example interactive interface 200 for replaying a user session and presenting data related to events that occurred during the session. FIGS. 3-8 are illustrations of example updates to the user interface 200 of FIG. 2 during the playback of an example user session. The interfaces include data regarding the quantities of user interactions with user interface elements when the elements are presented on the user interfaces that are viewed during a user session. In this example, the data is for all users that to which the user interfaces were presented. In some implementations, the publisher can filter the data for subsets of users, e.g., users in a particular location, users that viewed the user interfaces using particular types of devices or browsers, or user sessions in which particular events occurred, just to name a few examples. The filtering results in a set of user sessions that are under consideration based on the filtering parameters. For purposes of example, much of the discussion below refers to user interactions with a web page, but the discussion that follows is also applicable to other types of user interfaces, including native mobile/tablet applications, or other types of applications. The example user session begins with the loading of a main page of a publisher's website, "www.example.com." During the user session, the user navigates to a product page ("www.example.com/products") of the publisher's website. Although the example interfaces are described in terms of a user session in which a user views pages of a website, similar interfaces can be generated and presented for user sessions in which a user views content of a native application. The evaluation apparatus 110 can generate, provide, and update the interfaces, as described below. The interfaces can be presented to the publisher of the user interfaces or another user and the publisher or other user can interact with the interfaces to view other data, as described below.

The interface 200 includes a session replay area 210 in which playback of visual changes to one or more user interfaces that occurred during the user session are presented. For example, the session replay area 210 can present a "real-time" replay of the user session based on the events that occurred during the user session and changes to the user interfaces that occurred during the user session, e.g., based on the events. For example, if the user navigated from a first page to a second page ten seconds into the user session, the replay of the user session can present the transition from the first page to the second page ten seconds into the replay. As described above, the playback can be generated from event data for the user session, rather than recording and playing back a video of the user session. This greatly reduces the amount of data stored and transmitted over a network, and enables the user sessions to be searched based on the event data which would not be possible by simply storing and replaying videos.

The user interface 200 includes replay controls that include a play/pause control 214, a counter 215, an inactivity skipping control 216, and a playback bar 217. The play/pause button 214 enables a user, e.g., a publisher or user interface developer of a publisher, to start and stop replay of the user session by interacting with the play/pause button 214. The counter 215 provides a total duration of the user session (e.g., 4 minutes 33 seconds) and a portion of the user session that is currently being presented (e.g., 6 seconds). The inactivity skipping control 216 enables a user to toggle between skipping periods of inactivity during the user session and not skipping the periods of inactivity. For example, if a user is viewing a page without interaction for a period of time and the page is not changing during this period of time, this period of time can be skipped in the playback of the user session when the inactivity skipping control 216 is active. This enables the user to skip portions of the user session that may not be of interest to the user.

The playback bar 217 includes a sliding element 218 that indicates the portion of the user session currently being presented and enables a user to quickly move to other portions of the user session by sliding the sliding element 218 within the playback bar 217. In this example, the sliding element 218 is near the left side of the playback bar 217, indicating that the portion of the user session currently being presented is six seconds into the user session.

At this point in the user session, a main page is presented during playback of the user session. The main page includes an image 212 and text 213 related to the image 212, e.g., a title or description of the image 212. The image 212 and text 213 are user interface elements of the main page's user interface.

The interface 200 also includes a session replay control 220 and a page insights control 222. When selected, the session replay control 220 causes the interface 200 to present the playback of the user session, as shown in FIG. 2. In contrast, the page insights control 222 causes the interface 200 to present insights about the page (or other user interface) being presented in the session replay area 210 when the page insights control 222 is selected. As described below, the page insights include engagement heatmap visualizations. The user can switch back and forth between session replay and page insights modes using the controls 220 and 222.

The user interface 200 also includes a user session details area 230 that includes additional data about the user session. The user session details area 230 includes a session detail element 232 that includes details about the session, such as a user identifier for the user of the user session, a time at which the user session started, an operating system of the user device at which the user session occurred, a quantity of specified events that occurred during the user session, location information identifying a geographic location of the user device when the user session occurred, and an IP address of the user device when the user session occurred.

The user session details area 230 also includes an event stream area 233 that includes information about at least some of the events that occurred during the user session. The event stream area 233 includes an event element for each of the events. In this example, the event stream area 233 includes a page view element 234 that indicates that the page www.example.com was presented during the user session. The event stream area 233 also includes a clicked event element 236 that indicates that a particular user interface element was selected by a user of the user session, and other event elements below the clicked event element 236.

The event elements can be ordered sequentially in the order in which the events occurred during the user session. For example, the event element at the top can include information for the first event that occurred, the event element below the top event element can include information for the second event that occurred, and so on.

The visual characteristics of the event elements, e.g., the color or shading of the event elements, can vary to show which event occurred at a time during the user session that matches the time of the playback of the user session in the session replay area 210. For example, if the event represented by the event element 236 occurred ten seconds into the user session, the evaluation apparatus 110 can adjust the visual characteristics of the event element 236 at ten seconds into the playback of the user session to indicate to the publisher or other user viewing the playback that the event occurred when the user interface was in the state being shown in the playback. The evaluation apparatus 110 can maintain this adjusted visual characteristics of the event element 236 until the playback reaches the time at which the next event occurred and then update the visual characteristics of the event element for that event.

The evaluation apparatus 110 can also animate the event stream area 233 such that the event stream area 233 presents event elements for events that correspond to the playback of the user session in the session replay area. For example, the evaluation apparatus 110 can scroll the event elements such that when the playback reaches a point at which a particular event occurred during the user session, the event element for the particular event is visible in the event stream.

Figure 3:
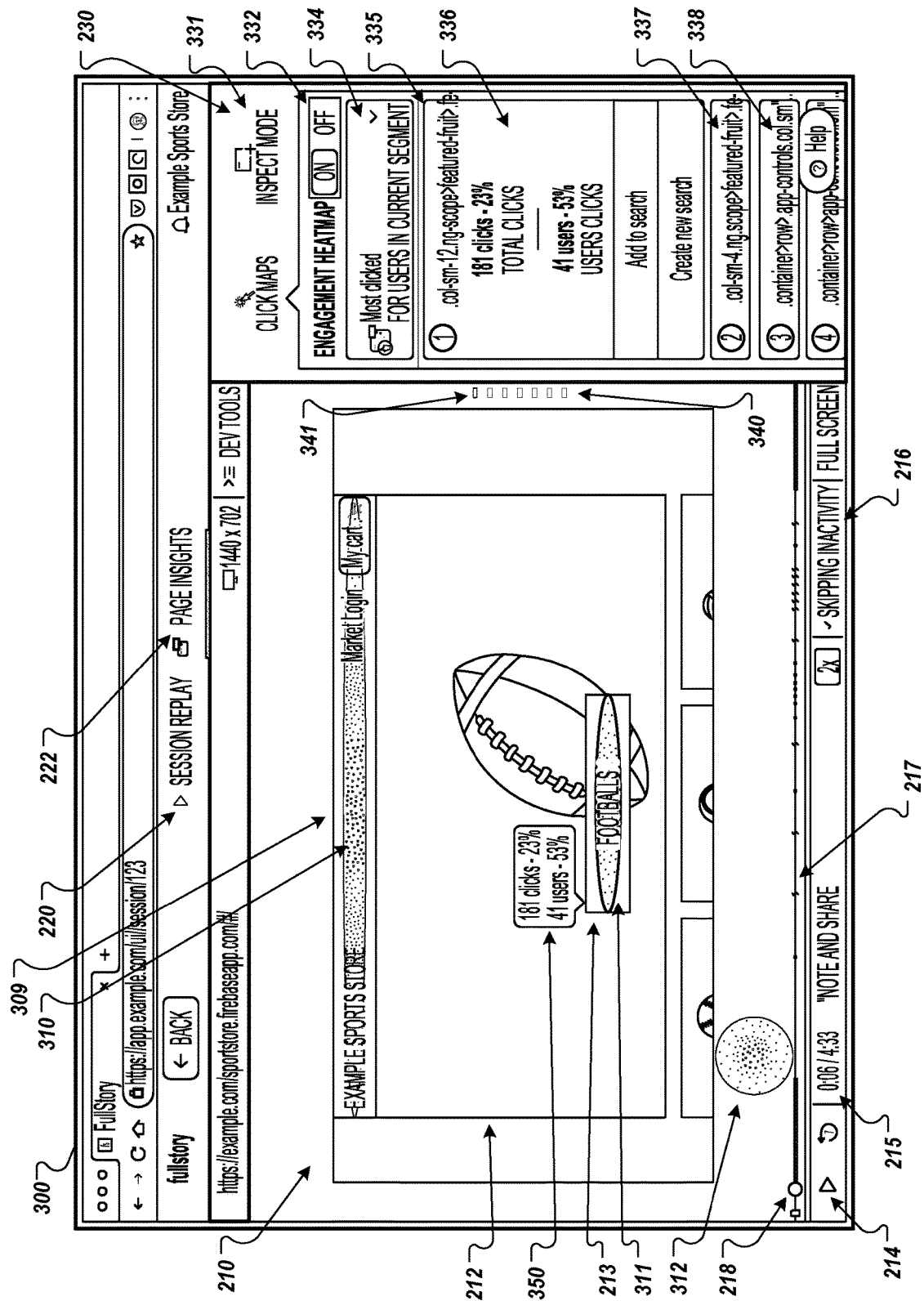
FIG. 3 is an illustration of an example interactive interface for replaying a user session and presenting engagement heatmap visualizations.

FIG. 3 is an illustration of an example interactive interface 300 for replaying a user session and presenting engagement heatmap visualizations. The interactive interface 300 is an updated view of the interactive interface 200 and includes many of the same elements as the user interface 200. In particular, the interactive interface 300 is presented in response to user selection of the page insights control 222 to view insights of the main page.

The evaluation apparatus 110 can pause the playback of the user session in the session replay area 210 to maintain presentation of the main page. The evaluation apparatus 110 also updates the interactive interface to include heatmap visualizations 310-312. Each heatmap visualization 310-312 represents a quantity of user interactions, e.g., user selections, of a user interface element of the main page, e.g., across multiple user sessions for multiple different user sessions. In particular, the heatmap visualization 310 represents a quantity of user interactions with an area 309 at the top of the main page; the heatmap visualization 311 represents a quantity of user interactions with the text 213 related to the image 212, and the heatmap visualization 312 represents a quantity of user interactions with an area of the main page below the image 212. Although not shown, the interactive interface 300 can also include a heatmap visualization for other elements presented in the user interface, such as the text "Market" at the top of the main page, the text "Login" at the top of the main page, or the "Mt cart" button at the top of the main page.

Each heatmap visualization 310-312 can include dots that represent the quantity of user interactions with the corresponding user interface element. For example, each dot of a heatmap visualization can represent a user interaction or specified number of user interactions with the corresponding user interface element. In another example, the actual number of dots are based on the size of the heatmap visualization and does not correspond to the number of user interactions. In some implementations, the dots of a heatmap visualization may not correspond to an actual location of a user interaction. Instead, the dots of a heatmap visualization can be concentrated near the center of the heatmap visualization with less concentration along the perimeter of the heatmap visualization.

The evaluation apparatus 110 can determine and generate the visual characteristics of each heatmap visualization 310-312 based on the quantity of user interactions represented by the heatmap visualization 310-312. For example, the evaluation apparatus 110 can rank the user interface elements of the main page based on the quantity of user interactions and assign visual characteristics to the heatmap visualizations based on the ranking. In a particular example, the evaluation apparatus 110 can assign a first color to the heatmap visualization for the highest ranked user interface element, a second color to the heatmap visualization for the second highest ranked user interface element, and so on. In other examples, the evaluation apparatus 110 can assign other visual characteristics to the heatmap visualizations 310-312 based on the ranking, such as color intensity, shading, heatmap size, or another appropriate visual characteristic.

In some implementations, the evaluation apparatus 110 can size the heatmap visualizations based on the quantity of user interactions represented by the heatmap visualization, e.g., the quantity of user interactions for the user interface element corresponding to the heatmap visualization. For example, more user interactions can result in larger heatmap visualizations. The size of the heatmap visualizations can be scaled based on the user interface element with the highest quantity of user interactions. For example, the heatmap visualization for the user interface element with the highest quantity of user interactions can be the largest heatmap visualization. The size of each other heatmap visualization can be based on a ratio (or percentage) between the quantity of user interactions for the element represented by the heatmap visualization and the highest quantity of user interactions. For example, if the user interface element with the highest quantity of user interactions has 100 user interactions and another user interface element has 50 user interactions, the heatmap visualization for the other user interface element may be 50% (e.g., 50/100*100) the size of the heatmap visualization for the user interface element with the highest quantity of user interactions.

The heatmap visualizations 310-312 can be presented over the corresponding user interface elements. In some implementations, the heatmap visualizations 310-312 are sized based on the size of the user interface element corresponding to the heatmap. For example, since the area 309 is larger than the text 213, the heatmap visualization 310 is larger than the heatmap visualization 311.

The user interaction quantity for a user interface element can be an aggregate for that element when the element is presented in an interface having the same state as the paused user interface. For example, if the user interface is a resource that has a DOM state, the user interaction quantity for each element can be aggregate (e.g., sum) of the user interactions with the element when the element was presented by the main page when the DOM for the main page had the same DOM state as the DOM state used to generate the main page as shown in FIG. 3.

When the playback is paused, the evaluation apparatus 110 can evaluate the structure of the user interface, e.g., the main page, and identify other user sessions that included the main page with the same DOM state. For example, the evaluation apparatus 110 can compare the DOM state used to generate the paused main page to the DOM state used to generate the main page in other user sessions. The evaluation apparatus 110 can then determine the quantity of times, across the identified user sessions, that each element was interacted with when the main page was presented using the same DOM state. For native applications, the evaluation apparatus 110 can perform a similar aggregation based on view tree state or other user interface structural states.

Figure 4:
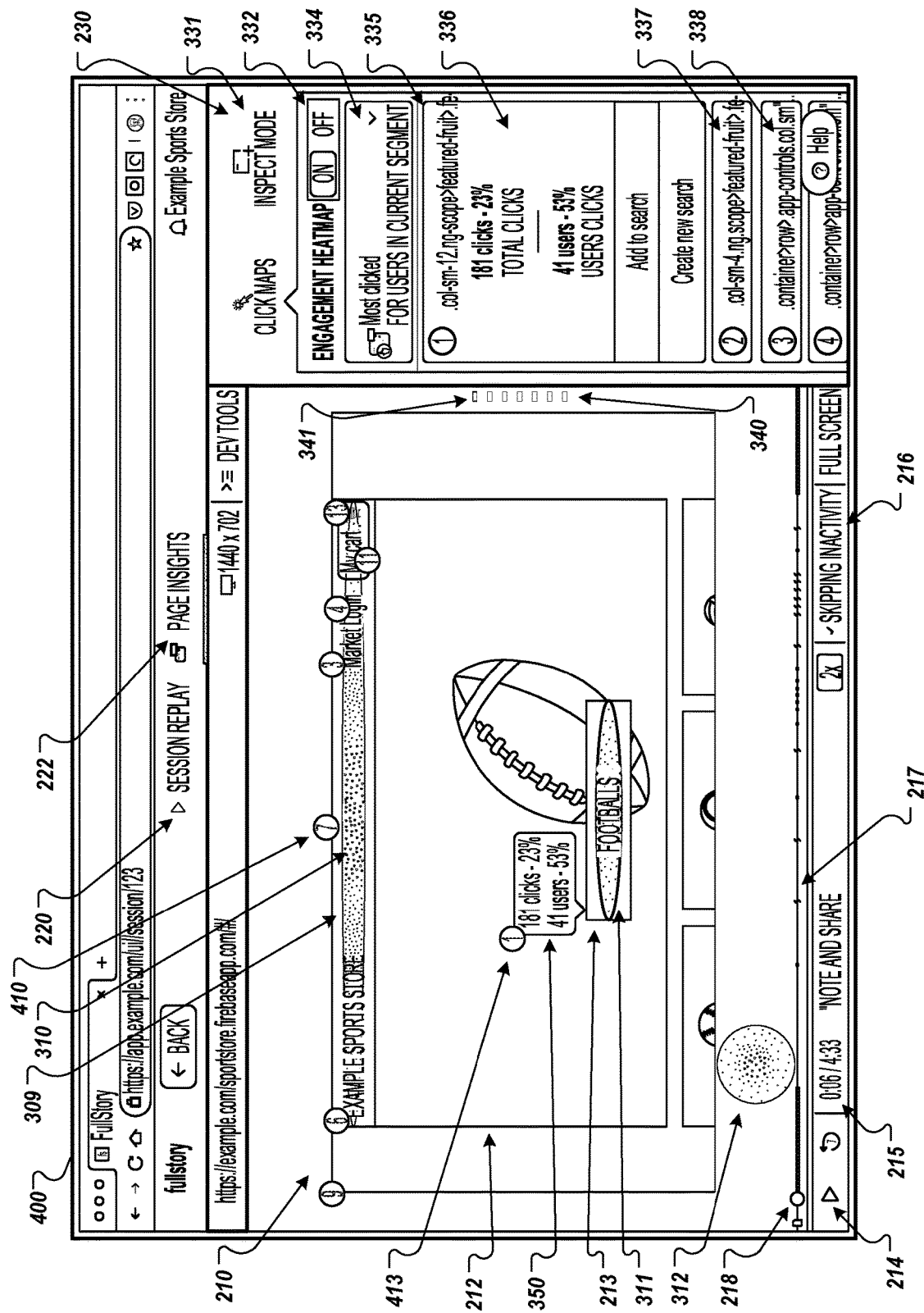
FIG. 4 is an illustration of an example interactive interface for replaying a user session and presenting click rank elements.

The interactive interface 300 also includes a color scale 340 for the heatmap visualizations 310-312. The color scale 340 includes a bar 341 for each heatmap visualization. In other examples, other geometric shapes can be used for the bars. The color of each bar is the same as the heatmap visualization corresponding to the bar. The order of the bars 341 can be based on the quantity of user interactions represented by the heatmap visualizations corresponding to the bars. For example, the bar 341 at the top of the color scale can be the same as the color of the heatmap visualization for the user interface that received the highest quantity of user interactions. This color-coding scheme enables a publisher to readily determine which user interface elements receive the most user interactions and which user interface elements receive the fewest user interactions. As shown in FIG. 4 and described below, the color scale 340 can be expanded to show the differences between the quantity of user interactions with each user interface element.

The interactive interface 300 also includes a caption 350 that includes the quantity of user interactions with the image description and the percentage of users that interacted with, e.g., selected by clicking on, the image description. The evaluation apparatus 110 can update the interactive interface 300 to present the caption 350 for the user interface element with the highest quantity of user interactions, e.g., when the publisher switches to page insights mode. In another example, the evaluation apparatus 110 can present the caption 350 for the user interface element for which a click element is shown in expanded view, as described below.

In the interactive interface 300, the evaluation apparatus 110 has also updated the user session details area 230 to include a page insights area 331 in place of the session detail element 232 and the event stream area 233. The page insights area 331 includes information about user interactions with the user interface elements of the user interface, e.g., the main page. The page insights area 331 includes an engagement heatmap control 332 that enables the publisher to turn the heatmaps visualizations on (to show them) or off (to hide them).

The page insights area 331 also includes a drop down control 334 that enables the publisher to select the type of user interactions to represent using the heatmap visualizations 310-312. In this example, each heatmap visualization 310-312 represents an aggregate quantity of user interactions with the corresponding user interface element. The drop down control 334 can enable the publisher to select between this aggregate quantity of all user interactions (e.g., all types of clicks), error clicks, rage clicks, and/or dead clicks. If the publisher selects a particular type of user interaction, the evaluation apparatus 110 can update the interactive interface 300 to replace the heatmap visualizations 310-312 with heatmap visualizations that have visual characteristics (e.g., colors) based on the quantity of user interactions of that type that each user interface element has received. For example, if the publisher selects rage clicks, the evaluation apparatus 110 can update the interactive interface 300 to present heatmap visualizations that represent the quantity of times users rage clicked on each user interface element.

The page insights area 331 also includes click elements list 335 that includes expandable click information elements 336-338 for user interface elements presented in the main page. The click information elements 336-338 can be ordered based on the quantity of user interactions with the corresponding user interface element. In this example, the image description has the highest total quantity of user interactions among the user interface elements of the main page. Thus, the top click information element 336 includes user interaction information for the image description. In this example, the click information element 336 includes the aggregate total quantity of user interactions with the image description and the percentage of users that interacted with the image description.

The click information element 336 is in an expanded view that shows this information. When a publisher turns the heatmaps on using the engagement heatmap control 332 or switches to page insights mode rather than playback mode, the evaluation apparatus 110 can present the top click information element 336 in the expanded view. If the publisher selects the top click information element 336, the evaluation apparatus 110 can update the interactive interface 300 to show the top click information element 336 in collapsed view, e.g., as the click information elements 337 and 338 are illustrated in FIG. 3. In addition, the evaluation apparatus 110 can update the interface to show the expanded view of the next click information element 337 in the click elements list 335. If the publisher selects the top click information element 336 again, the evaluation apparatus can collapse the click information element 337 and show the expanded view of the next click information element 338, and so on down the click elements list 335. In this way, the publisher can view the information for each user interface element in order by simply clicking multiple times in the same area of the interactive interface 300.

In addition, when a click element for a user interface element is presented in the expanded view, the evaluation apparatus 110 can present a caption similar to the caption 350 at the user interface element. Each caption can include the quantity of user interactions with the corresponding user interface element and the percentage of users that interacted with the user interface element when presented to the users. In this way, the publisher can readily identify which user interface element corresponds to the expanded click element and view the information in the caption at the user interface element.

The information in the click elements and the order of the click elements in the list 335 are also based on the type of user interactions selected using the drop down control 334. For example, the click information element 336 includes the aggregate quantity of user interactions with the image description. If the publisher selects error clicks, the click elements would include the quantity of error clicks and for their corresponding user interface elements and the percentage of users that experienced error clicks with their corresponding user interface elements. For example, if the image description also had the highest quantity of error clicks, the click information element 336 would include the quantity of clicks on the image description that were classified as error clicks and the percentage of users that experienced an error click when clicking on the image description.

In some implementations, the evaluation apparatus 110 provides heatmap visualizations for up to a specified number of user interface elements, e.g., for up to 10, 20, 25, or another appropriate number of user interfaces. If the user interface, e.g., main page, includes more than the specified number of elements, the evaluation apparatus 110 can provide engagement heatmaps for the user interface elements that users have interacted with the most, e.g., the top 25 user interface elements if 25 is the specified number. In this example, the heatmap and bar for the element having the 25$^{th}$ most user interactions can be presented in the color for the element having the fewest user interactions even though other elements for which a heatmap visualization is not presented have fewer interactions.

FIG. 4 is an illustration of an example interactive interface 400 for replaying a user session and presenting click rank elements. The interactive interface 400 is an updated view of the interactive interface 300 and includes many of the same elements at the interactive interface 300. In particular, the interactive interface 400 is presented in response to a publisher hovering a pointer, e.g., a mouse cursor, over the session replay area 210.

When the publisher hovers a pointer over the session replay area 210 or a particular area within the replay area 210, the evaluation apparatus 110 can update the interactive interface 400 to present click rank elements 410 for the user interface elements. Each click rank element can include a number that indicates the rank of the user interface elements based on the quantity of user interactions with the user interface element. For example, the interactive interface 400 includes a click rank element 413 for the image description, which has the highest quantity of user interactions. Thus, this click rank element 413 includes the number one. The click rank element for the user interface element with the second highest quantity of user interactions can include the number two, and so on. The click rank elements can be based on the type of user interaction selected using the drop down control 334. For example, if rage clicks are selected, the click element with the number one can be presented by the user interface element with which users have rage clicked the most.

Figure 5:
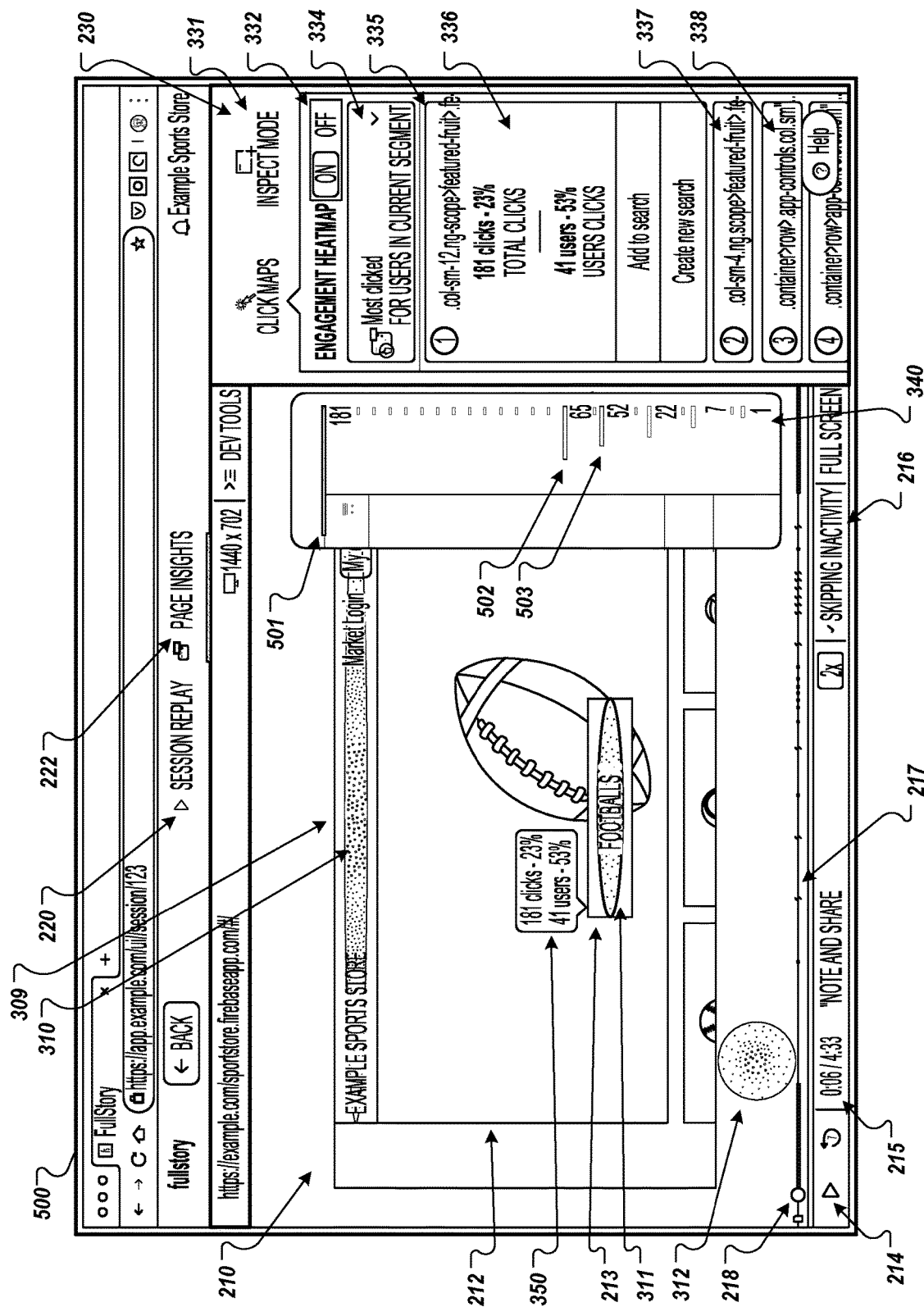
FIG. 5 is an illustration of an example interactive interface for replaying a user session and presenting an expanded view of a color scale for engagement heatmap visualizations.

FIG. 5 is an illustration of an example interactive interface 500 for replaying a user session and presenting an expanded view of a color scale for engagement heatmap visualizations. The interactive interface 500 is an updated view of the interactive interface 400 and includes many of the same elements as the interactive interface 400. In particular, the interactive interface 500 is presented in response to a publisher hovering a pointer, e.g., a mouse cursor, over the color scale 340.

When the publisher hovers a pointer over the color scale 340, the evaluation apparatus 110 can expand the color scale 340 as shown in FIG. 5. In other examples, the color scale 340 can be expanded in response to other user interactions, e.g., clicking on a control that expands the color scale 340. In the expanded color scale 340, the bar for each user interface element has a size, e.g., length, that is based on the quantity of user interactions for the user interface element. For example, the length of each bar can be based on the percentage of user interactions for the element corresponding to the bar compared to the element with the most user interactions. In a particular example, the image description has 181 clicks and the element with the second most clicks has 65 clicks. In this example, the length of the bar 502 for the second element can have a length that is 36% (65/181*100) of the length of the bar 501 for the image description.

In some implementations, the color scale 340 and heatmap visualizations have a specified color (or other visual characteristic) for each position in a ranking of user interface elements by quantity of user interactions. The evaluation apparatus 110 can determine to not use some of the colors based on the variance in the quantities of user interactions. For example, if the difference between the quantities of user interactions for two adjacent positions in the ranking (e.g., first and second, or second and third) is significant (e.g., greater than a threshold), the evaluation apparatus 110 can determine to skip one or more colors and use the color for a lower position for the bar and heatmap visualization for the user interface element having the lower rank, thereby providing additional visual indications as to the disparity between the quantities of user interactions between the two adjacent positions in the rankings.

In this example, the difference in user interactions for the image description and the second ranked user interface element is much greater than the difference between each pair of adjacent lower-ranked user interface elements. Thus, the expanded color scale 340 includes a large gap between the bar 501 and the bar 503 due to the colored bars between 501 and 502 not being used for any of the user interface elements. In contrast, the difference between the quantity of user interactions for the second ranked user interface element and the third ranked user interface element is much smaller (i.e., 65−52=13), the bars 502 and 503 are closer together and only a single colored bar was skipped between these two user interface elements. By showing the bars of the color scale 340 in this manner with gaps based on differences in quantities of user interactions, a publisher can readily determine the vast differences between the quantities of user interactions.

Figure 6:
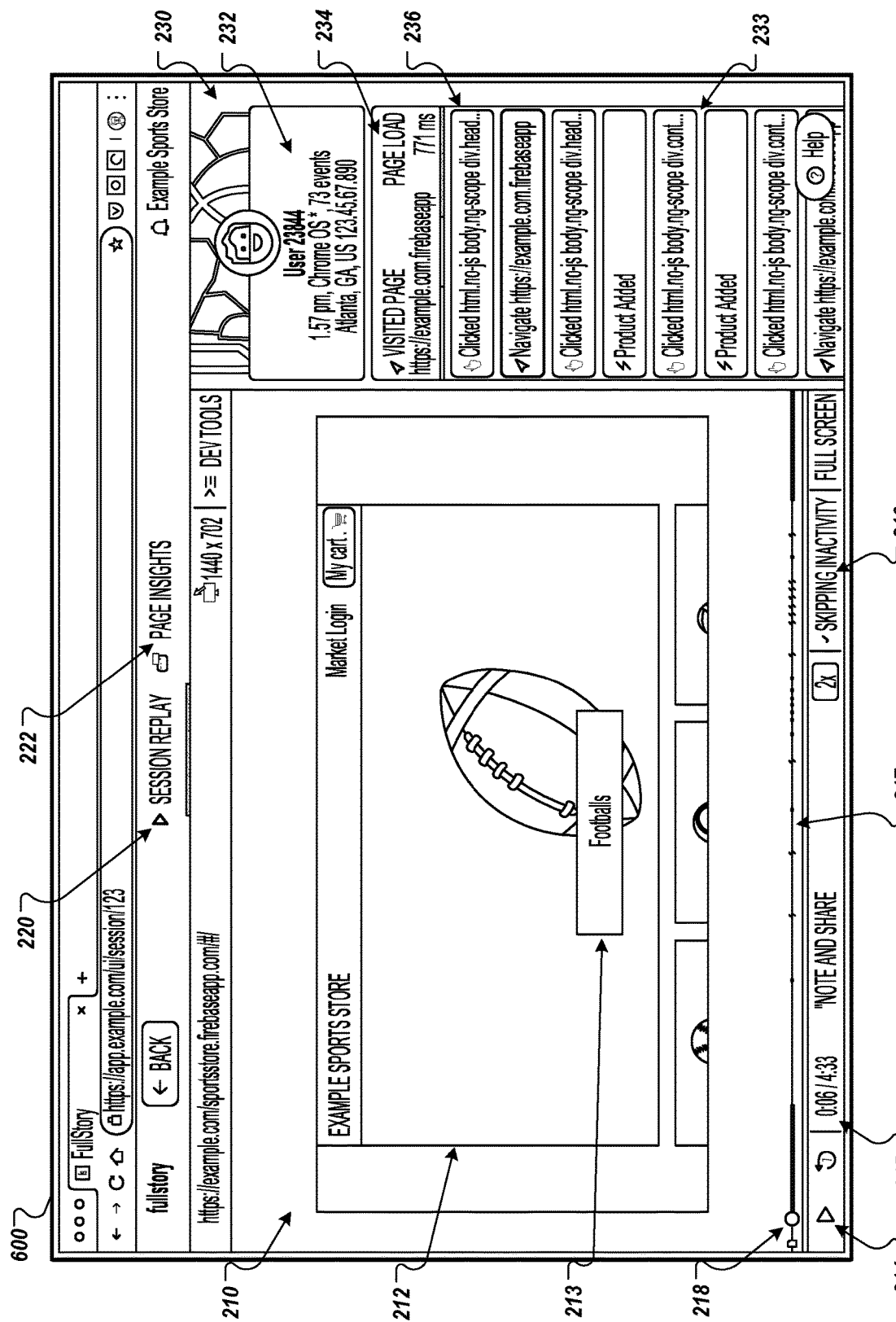
FIG. 6 is an illustration of an example interactive interface for replaying a user session and presenting data related to events that occurred during the session.

FIG. 6 is an illustration of an example interactive interface 600 for replaying a user session and presenting data related to events that occurred during the session. The interactive interface 600 is an updated view of the user interface 500. In particular, the interactive interface 600 is presented in response to a publisher selecting the session replay control 220.

When the publisher selects the session replay control 220, the evaluation apparatus 110 switches from the page insights mode to the session replay mode. The evaluation apparatus 110 can also automatically restart the playback of the user session. In another example, the evaluation apparatus 110 can wait for the publisher to select the play/pause control 214 to restart the playback. In switching back to the session replay mode, the evaluation apparatus 110 also replaces the page insights area 331 with the session detail element 232 and the event stream area 233.

Figure 7:
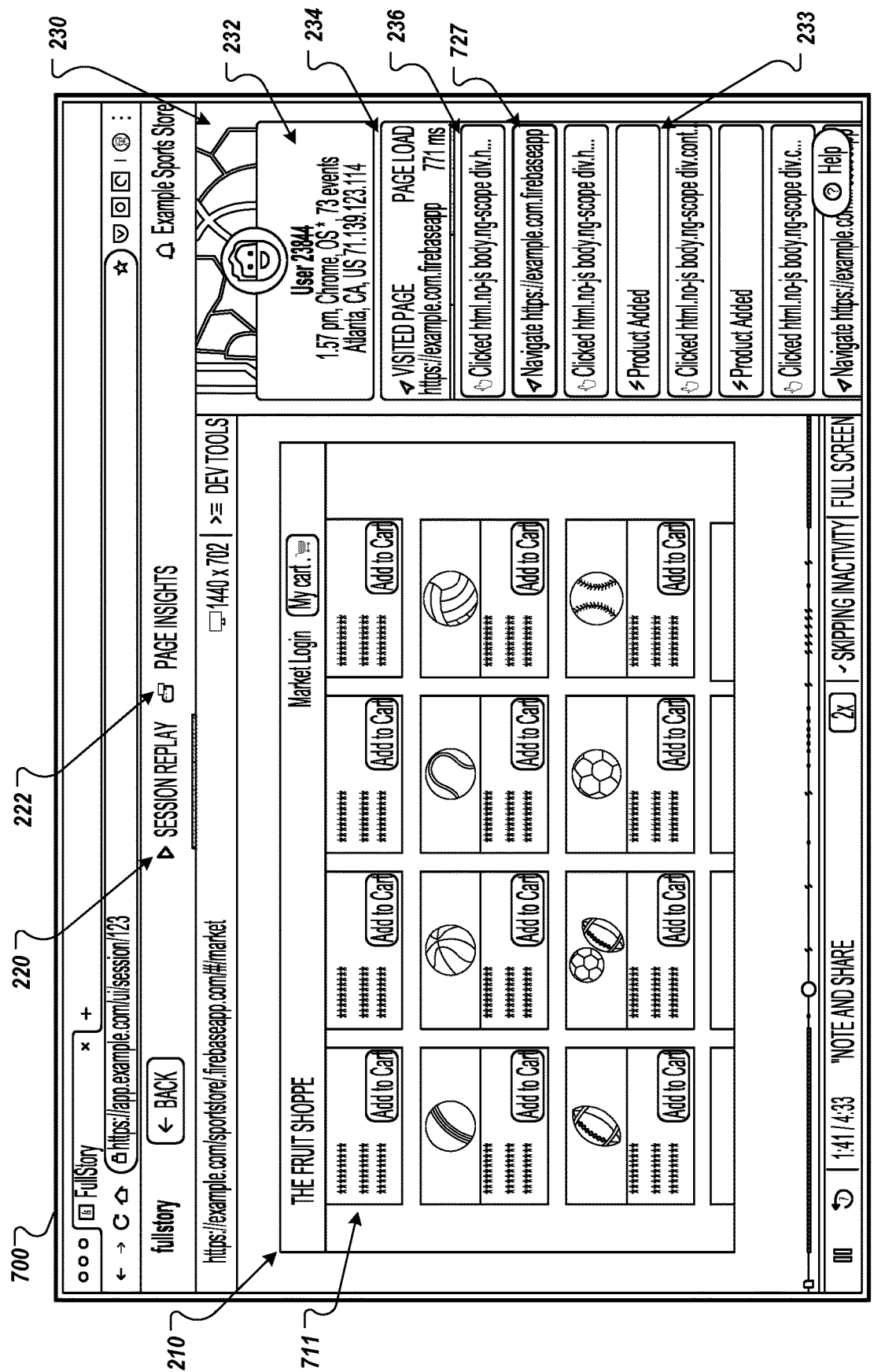
FIG. 7 is an illustration of an example interactive interface for replaying a user session and presenting data related to events that occurred during the session.

FIG. 7 is an illustration of an example interactive interface 700 for replaying a user session and presenting data related to events that occurred during the session. The interactive interface 700 is an updated view of the user interface 600. In particular, the playback of the user session has advanced to a part of the user session in which a products page 711 is presented instead of the main page. In addition, the event stream area 233 has been updated to indicate that the most current event is the navigation from the main page to the products page by presenting the navigation event element 727 in a different color (or in a different intensity of the same color) than the other event elements (e.g., the clicked event element 236) in the event stream area 233. Other visual characteristics can be used to indicate the event element that corresponds to the event that occurred in the user session at a time that corresponds to the current position in the playback of the user session.

Figure 8:
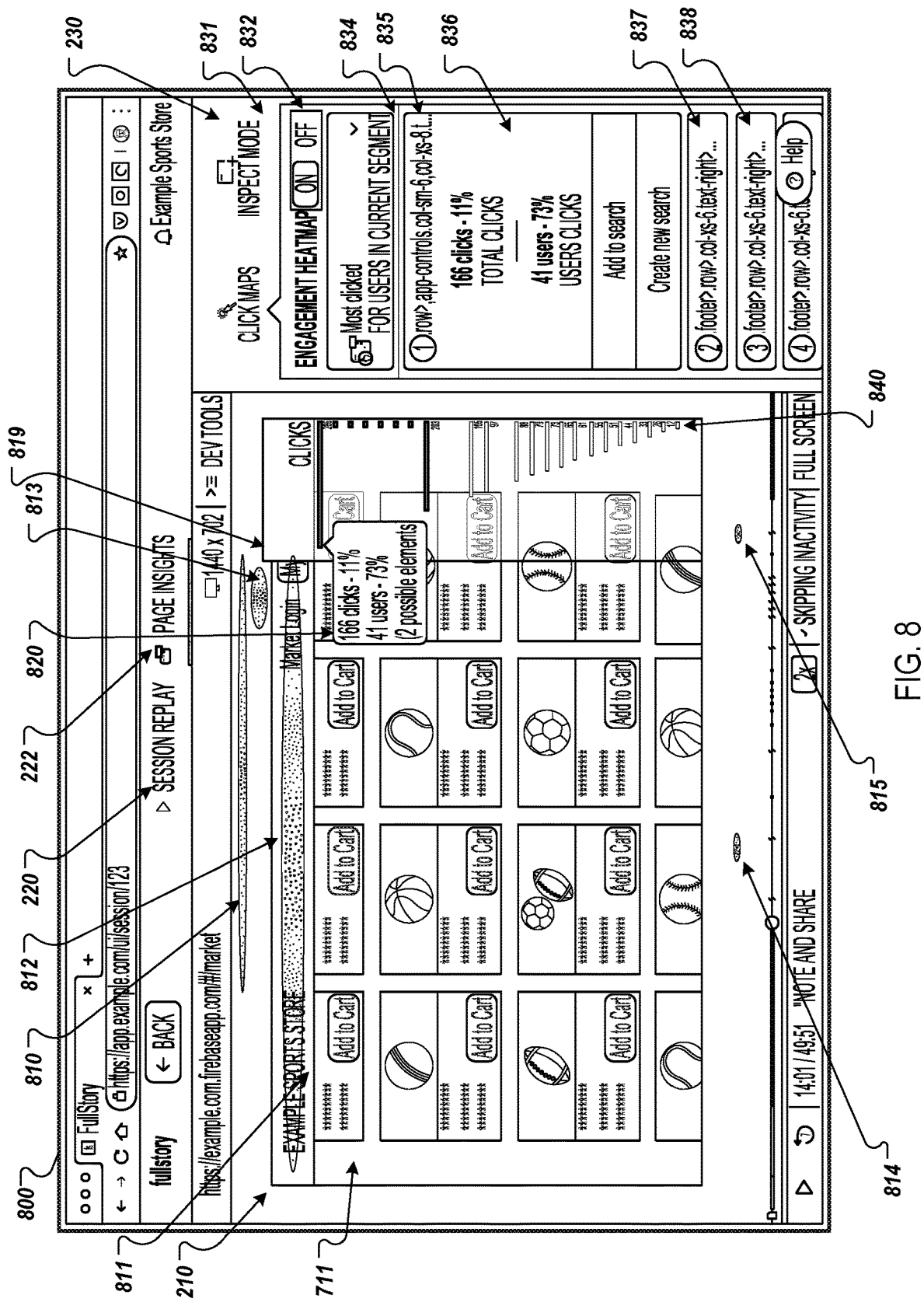
FIG. 8 is an illustration of an example interactive interface for replaying a user session and presenting engagement heatmap visualizations.

FIG. 8 is an illustration of an example interactive interface 800 for replaying a user session and presenting engagement heatmap visualizations. The interactive interface 800 is an updated view of the user interface 700. In particular, the interactive interface 800 is presented in response to user selection of the page insights control 222 to view insights of the products page. For example, after viewing the user interaction data for the main page, the publisher can continue viewing the playback of the user session as described above with reference to FIGS. 6 and 7. After viewing the navigation to the products page, the publisher may want to view similar user interaction data for the products page.

The interface 800 includes heatmap visualizations 810-815, a caption 820 for the element with the most user interactions, a color scale 840, and a user session details area 230 that includes a page insights area 831. The caption 820 includes the quantity of user interactions with a button 819 (under the color scale 840) and the percentage of users that interacted with, e.g., selected by clicking on, the button 819. In this example, the caption 820 also indicates that the user interactions may actually belong to two possible elements. For example, if the user interactions, e.g., clicks, are located near (e.g., within a threshold number of pixels) of two different elements, the evaluation apparatus 110 can include, in the caption 820, data indicating that the user interactions may belong to two different elements.

The color scale 840 is shown in expanded form, e.g., in response to the publisher hovering a pointer over the color scale 840. In this example, the variance in user interactions between the user interface elements is not as great as the variance for the main page. Thus, the gaps between bars of the color scale 840 are not as large as those in the color scale 340 shown in FIG. 5.

The page insights area 831 is similar to the page insights area 331 of FIG. 3. In particular, the page insights area 831 includes information about user interactions with the user interface elements of the products page. The page insights area 331 includes an engagement heatmap control 832 that enables the publisher to turn the heatmaps visualizations on or off, a drop down control 834 that enables the publisher to select the type of user interactions to represent using the heatmap visualizations 810-815, and a click elements list 835 that includes click information elements 836-838 for user interface elements presented in the main page.

Figure 9:
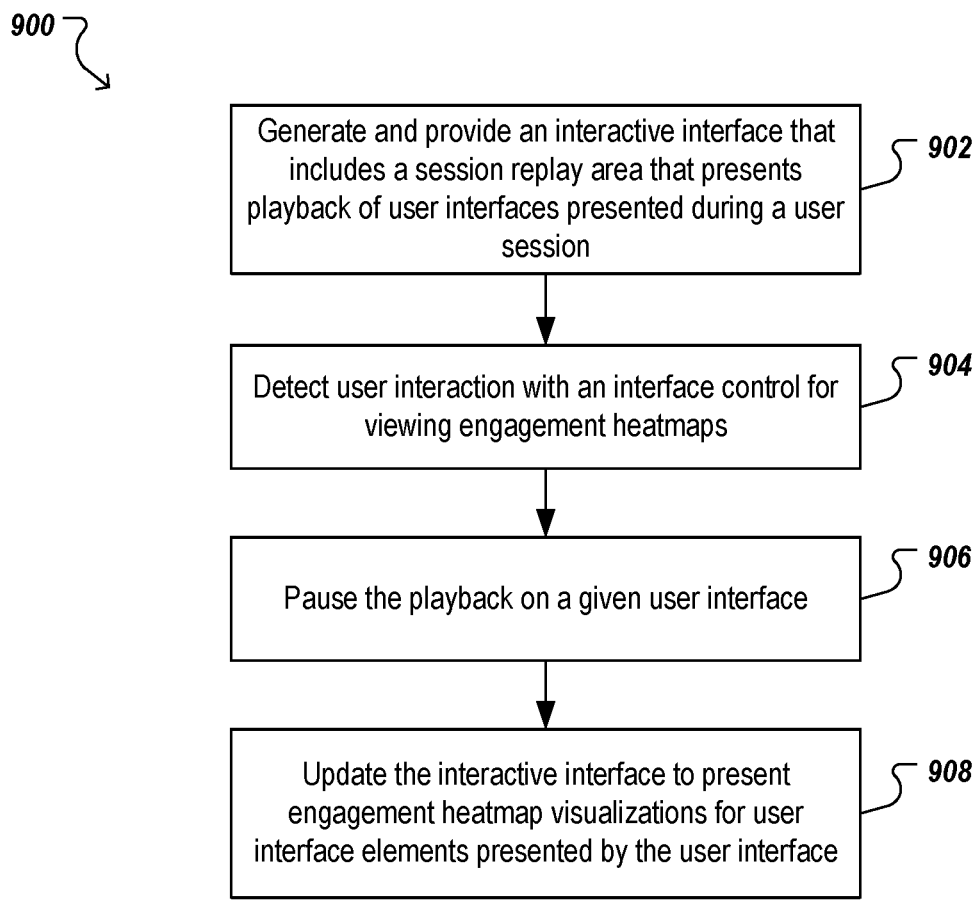
FIG. 9 is a flow chart of an example process for generating and providing an interactive interface that includes engagement heatmap visualizations.

FIG. 9 is a flow chart of an example process 900 for generating and providing an interactive interface that includes engagement heatmap visualizations. Operations of the process 900 can be performed, for example, by one or more data processing apparatus, such as the evaluation apparatus 110. Operations of the process 900 can also be implemented as instructions stored on a non-transitory computer readable medium. Execution of the instructions cause one or more data processing apparatus to perform operations of the process 900.

An interactive interface is generated and provided (902). The interactive interface can be generated and provided to a device of a publisher. The interactive interface can present data related to one or more user sessions with user interfaces published by the publisher. For example, the interactive interface can present data related to user interactions with web resources and/or application content of native applications.

The interactive interface can include a session replay area in which playback of one or more user interfaces, e.g., one or more logical pages, of the publisher were presented during a user session. As described above, the playback can be generated from event data collected during the user session, rather than recording and playing back a video of the user session. The session replay area can present a "real-time" replay of the user session based on the events that occurred during the user session and changes to the user interfaces that occurred during the user session, e.g., based on the events. During playback, user interactions, e.g., mouse movements, can also be presented. The interactive interface can also include an event stream that includes event elements for events that occurred during the user session.

User interaction with an interface control is detected (904). The interface control can be a button, icon, or other control for requesting presentation of heatmap visualizations for a user interface that is currently being presented in the playback of the user session. For example, the evaluation apparatus 110 can detect the user interaction based on data received from the device of the publisher. This data can include data specifying the control interacted with by the publisher.

Playback is paused on a user interface (906). For example, the evaluation apparatus can pause the playback in response to detecting the user interaction with the interface control. While paused, the replay area can maintain presentation of the user interface, e.g., logical page, that was being presented when the interaction with the interface control was detected. In this way, additional data related to the user interface can be presented with the user interface.

The interactive interface is updated to present engagement heatmap visualizations for user interface elements presented by the user interface (908). The heatmap visualization for a user interface element can be presented over the element in the user interface while presentation of the user interface is maintained due to pausing playback. The heatmap visualization for each element represents a quantity of user interactions with the element that have been detected. For example, the color (or other visual characteristic) of each heatmap visualization can represent, and be based on, the relative quantity of user interactions with the element as compared to the other user elements presented by the user interface.

In a particular example, a common color scheme can be used for each user session. The common color scheme can include a first color for the user interface element with the highest quantity of user interactions, a second color (different from the first color) for the user interface element with the second highest quantity of user interactions, and so on. In another example, shades or intensities of one or more colors can be used to represent the quantity of user interactions. For example, the heatmap visualization for the user interface element with the highest quantity of user interactions can be in a first intensity of a color, the heatmap visualization for the user interface element with the second highest quantity of user interactions can be in a second intensity of a color that is less intense than the first intensity, and so on.

In another example, a first color can be used for a first portion, e.g., first half, of the user interface elements having the highest quantities of user interactions and a second color can be used for a second portion, e.g., second half of the user interface elements having the fewest quantities of user interactions. Different intensities of the first color can be used to differentiate the elements in the first portion and different intensities of the second color can be used to differentiate the elements of the second portion. For example, different intensities of pink (or another color) can be used for the first portion and different intensities of blue (or another color different from the first color) can be used for the second portion. Using different colors, different intensities of colors, and/or other visual characteristics conveys a magnitude of the relative quantities of user interactions with each element.

The evaluation apparatus 110 can assign a color (or other visual characteristic) to the heatmap visualization of each user interface element for which a heatmap visualization is presented. For example, the evaluation apparatus 110 can rank the user interface elements based on the quantity of user interactions for each user element. The evaluation apparatus 110 can then assign the colors (or other visual characteristics) to the heatmap visualizations based on the rank. The evaluation apparatus can assign the color (or other visual characteristic) that represents the most user interactions to the heatmap visualization for the user interface element that is highest in the ranking, then assign the color (or other visual characteristic) that represents the second most user interactions to the heatmap visualization for the user interface element that is second in the ranking, and so on.

In addition to updating the interactive interface to present the heatmap visualizations, the interactive interface can be updated to present a color scale. The color scale can include a set of bars (or other geometric shapes) that include the colors of the heatmap visualizations. For example, if the evaluation apparatus 110 provides heatmap visualizations for up to 20 elements, the color scale can include 20 bars. The evaluation apparatus 110 can assign the bars to the user interface elements, e.g., based on the ranking of the elements. If the user interface that is paused in the playback of the user session includes fewer than 20 elements, the evaluation apparatus 110 can assign the bars to the elements based on the relative differences in the quantities of user interactions, e.g., while skipping some bars between user interface elements to show these differences, as described above with reference to FIG. 5. The evaluation apparatus can then assign the color of the bar for a user interface element to the heatmap visualization for the user interface element so that the bar and heatmap visualization have the same color.

As described above, the color scale can be expanded in response to user interaction, e.g., a mouse hover, over the color scale. In the expanded view, or in the non-expanded view, the length of each bar can be based on the quantity of user interactions for the user interface element corresponding to the bar. For example, the length of each bar can be based on the percentage of user interactions for the element corresponding to the bar compared to the element with the most user interactions, as described above. In another example, the length of each bar can be based on, e.g., proportional to, a ratio between the quantity of user interactions for the element corresponding to the bar and the quantity of user interactions for the element having the highest quantity of user interactions.

The interactive interface can also include an event stream that includes an expandable information element for each user interface element in the paused user interface. When expanded, the information element for a user interface element can include quantity of user interactions with the element and the percentage of users that interacted with the element. The information elements can be ordered based on the quantity of user interactions with the corresponding user interface elements.

If the publisher interacts with an unexpanded information element, the evaluation apparatus 110 can expand the information element. In addition, the evaluation apparatus can present a caption at the user interface element corresponding to the information element. The caption can include the same information as the information element, but presented by the user interface element so that the publisher can identify which user interface element corresponds to the information element.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
generating and providing, to a client device, an interactive interface that includes a session replay area that presents playback of user interfaces presented during a user session;
detecting, based on interaction data received from the client device, user interaction with an interface control for viewing engagement heatmaps;
in response to detecting the user interaction with the interface control:
pausing the playback such that a given user interface that is being presented in the session replay area when the user interaction with the interface control is detected remains visible in the interactive interface while the playback is paused; and
updating the interactive interface to present, for each of two or more user interface elements presented by the given user interface, an engagement heatmap visualization that visually represents a quantity of user interactions with the user interface element when the user interface element was presented by the given interface, wherein the engagement heatmap visualization for each user interface element is presented in a different color than the engagement heatmap visualization for each other user interface element; and
presenting a color scale comprising, for at least a portion of the two or more user interface elements, a geometric shape that has a same color as the engagement heatmap visualization for the user interface element, wherein the geometric shapes in the color scale are ordered based on a ranking of the two or more user interface elements, and wherein the user interface elements are ranked based on the quantity of user interactions for each user interface element during a set of sessions under consideration.

2. The method of claim 1, wherein the engagement heatmap visualization for each user interface element is presented over the user interface element while the playback is paused.

3. The method of claim 1, wherein the engagement heatmap visualization for each user interface element visually conveys a magnitude of a relative quantity of user interactions for the two or more user interface elements.

4. The method of claim 3, further comprising determining, for each engagement heatmap visualization, the color for the engagement heatmap visualization based on the ranking of the user interface elements.

5. The method of claim 1, wherein each geometric shape is a bar that has a length based on the quantity of user interactions for the user interface element corresponding to the bar.

6. The method of claim 5, wherein the length of each bar is based on a ratio between the quantity of user interactions for the user interface element corresponding to the bar and a quantity of user interactions for a given user interface element that had the highest quantity of user interactions.

7. The method of claim 5, wherein adjacent bars in the color scale are spaced apart based on a difference between the quantities of user interactions for the adjacent bars.

8. The method of claim 1, wherein the user interface includes an event stream that includes event elements for a sequence of events detected during the user session.

9. The method of claim 8, further comprising, updating the event stream to present a sequence of expandable information elements for the user interface elements, wherein each expandable information element corresponds to a respective user interface element and includes, when expanded, data specifying the quantity of user interactions for the respective user interface element.

10. The method of claim 9, further comprising:
detecting user interaction with a given expandable information element; and
in response to detecting the user interaction with the given expandable information element, updating the interactive interface to present a caption over a given user interface element corresponding to the given expandable information element, wherein the caption includes data specifying the quantity of user interactions for the given user interface element.

11. The method of claim 9, wherein the expandable information elements are ordered based on the quantity of user interactions for the user interface elements corresponding to the expandable information elements.

12. A system comprising:
a data store; and
one or more computers that interact with the data store and execute instructions that cause the one or more computers to perform operations comprising:
generating and providing, to a client device, an interactive interface that includes a session replay area that presents playback of user interfaces presented during a user session;
detecting, based on interaction data received from the client device, user interaction with an interface control for viewing engagement heatmaps;
in response to detecting the user interaction with the interface control:
pausing the playback such that a given user interface that is being presented in the session replay area when the user interaction with the interface control is detected remains visible in the interactive interface while the playback is paused; and
updating the interactive interface to present, for each of two or more user interface elements presented by the given user interface, an engagement heatmap visualization that visually represents a quantity of user interactions with the user interface element when the user interface element was presented by the given interface, wherein the engagement heatmap visualization for each user interface element is presented in a different color than the engagement heatmap visualization for each other user interface element; and
presenting a color scale comprising, for at least a portion of the two or more user interface elements, a geometric shape that has a same color as the engagement heatmap visualization for the user interface element, wherein the geometric shapes in the color scale are ordered based on a ranking of the two or more user interface elements, and wherein the user interface elements are ranked based on the quantity of user interactions for each user interface element during a set of sessions under consideration.

13. The system of claim 12, wherein the engagement heatmap visualization for each user interface element is presented over the user interface element while the playback is paused.

14. The system of claim 12, wherein the engagement heatmap visualization for each user interface element visually conveys a magnitude of a relative quantity of user interactions with each for the two or more user interface elements.

15. The system of claim 14, wherein the operations comprise determining, for each engagement heatmap visualization, the color for the engagement heatmap visualization based on the ranking of the user interface elements.

16. The system of claim 12, wherein each geometric shape is a bar that has a length based on the quantity of user interactions for the user interface element corresponding to the bar.

17. The system of claim 16, wherein the length of each bar is based on a ratio between the quantity of user interactions for the user interface element corresponding to the bar and a quantity of user interactions for a given user interface element that had the highest quantity of user interactions.

18. A non-transitory computer readable medium storing instructions that upon execution by one or more computers cause the one or more computers to perform operations comprising:
   generating and providing, to a client device, an interactive interface that includes a session replay area that presents playback of user interfaces presented during a user session;
   detecting, based on interaction data received from the client device, user interaction with an interface control for viewing engagement heatmaps;
   in response to detecting the user interaction with the interface control:
      pausing the playback such that a given user interface that is being presented in the session replay area when the user interaction with the interface control is detected remains visible in the interactive interface while the playback is paused; and
      updating the interactive interface to present, for each of two or more user interface elements presented by the given user interface, an engagement heatmap visualization that visually represents a quantity of user interactions with the user interface element when the user interface element was presented by the given interface, wherein the engagement heatmap visualization for each user interface element is presented in a different color than the engagement heatmap visualization for each other user interface element; and
      presenting a color scale comprising, for at least a portion of the two or more user interface elements, a geometric shape that has a same color as the engagement heatmap visualization for the user interface element, wherein the geometric shapes in the color scale are ordered based on a ranking of the two or more user interface elements, and wherein the user interface elements are ranked based on the quantity of user interactions for each user interface element during a set of sessions under consideration.

19. The non-transitory computer readable medium of claim 18, wherein the engagement heatmap visualization for each user interface element is presented over the user interface element while the playback is paused.

20. The non-transitory computer readable medium of claim 18, wherein each geometric shape is a bar that has a length based on the quantity of user interactions for the user interface element corresponding to the bar.

21. The non-transitory computer readable medium of claim 20, wherein the length of each bar is based on a ratio between the quantity of user interactions for the user interface element corresponding to the bar and a quantity of user interactions for a given user interface element that had the highest quantity of user interactions.

* * * * *

UNITED STATES PATENT AND TRADEMARK OFFICE
CERTIFICATE OF CORRECTION

PATENT NO. : 11,093,119 B2
APPLICATION NO. : 16/528111
DATED : August 17, 2021
INVENTOR(S) : Jaime Michael Yap et al.

It is certified that error appears in the above-identified patent and that said Letters Patent is hereby corrected as shown below:

In the Claims

Claim 14, Column 29, Line 11 – after "interactions" delete "with each".

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*